PREFERRED CUSTOMER COMMUNICATION SYSTEM

Filed Nov. 30, 1962

6 Sheets-Sheet 1

INVENTORS: D. A. JAMES
J. B. KENNEDY
B. Mc KIM
H. A. SHEPPARD

BY S E Hollander
ATTORNEY

June 22, 1965 D. A. JAMES ETAL 3,190,966

PREFERRED CUSTOMER COMMUNICATION SYSTEM

Filed Nov. 30, 1962 6 Sheets-Sheet 2

PREFERRED CUSTOMER COMMUNICATION SYSTEM

Filed Nov. 30, 1962

PRESERRED CUSTOMER COMMUNICATION SYSTEM

June 22, 1965 D. A. JAMES ETAL 3,190,966

PREFERRED CUSTOMER COMMUNICATION SYSTEM

Filed Nov. 30, 1962 6 Sheets-Sheet 5

3,190,966
PREFERRED CUSTOMER COMMUNICATION SYSTEM

Donald A. James, Union Hill, N.J., James B. Kennedy, Staten Island, N.Y., and Burton McKim, Morristown, and Hubert A. Sheppard, Orange, N.J., assignors to Bell Telephone Laboratories, Incorporated, New York, N.Y., a corporation of New York Filed Nov. 30, 1962, Ser. No. 241,243
17 Claims. (Cl. 179—18)

Our invention relates to communication networks and particularly to arrangements for establishing special priority communication paths between a plurality of preferred customers.

In a more particular aspect our invention relates to telephone switching networks including a plurality of trunk interconnected telephone switching offices wherein preset signaling and controlling arrangements are provided for establishing a right-of-way connection between preferred customers whereby certain regular interoffice trunks are preemptorily severed from regular customer service connections and, under control of a preferred customer, are thereafter serially connected to complete a right-of-way connection between the preferred customers.

In communication networks having a plurality of communication centers each in turn serving its own customers and wherein communication is effected between these customers over communication paths such as telephone trunk lines, carrier lines, radio links and the like, it is often desirable to provide special arrangements whereby certain preselected communication paths can be rendered inaccessible to the regular customers served by that communication center and thereafter used for special service calls.

For instance, in accordance with one exemplary embodiment of our invention it is sometimes advantageous to permit certain so-called "preferred" customers in large telephone switching networks to establish direct priority connections with each other. This service feature is particularly important during times of disaster, such as during a hurricane or during a national emergency, when certain public officials require expeditious communication service in order to direct rescue, first aid and similar type emergency operations.

Experience has shown that during these periods of disaster the regular communication networks frequently become overburdened with regular customer calls and normally accessible communication paths are often unavailable for essential calls. As a result, serious delays in completing essential calls are encountered whereby the emergency operations may be greatly hampered.

To satisfy emergency communication needs, systems have been devised which provide special emergency communication paths between the preferred customers on a permanent basis. These paths are separate from the regular community telephone switching network and are for the exclusive use of the preferred customers. But, in switching networks where the preferred customers are widely scattered over a large geographical area, the preferred customers are frequently separated from each other by many intermediate switching centers which may be interconnected by elaborate carrier and radio systems. Under these circumstances, it is often very costly to provide continuously available special facilities for the exclusive use of the preferred customers. especially when these facilities are used so infrequently.

Heretofore certain other preferred customer communication arrangements enabled a preferred customer to seize the next communication path to become available in preference to other regular customers awaiting service and without disturbing any priorly established connections. It will be readily apparent that these arrangements also have certain disadvantages in that some delay may be encountered in establishing the preferred call due to the necessity of waiting for a busy communication path to become available.

Other right-of-way communication systems are known in telephone switching whereby certain trunks normally available to the regular switching network are arranged in a special manner so that preferred customers can commandeer these trunks whether or not the trunks are presently engaged on a regular customer call. If the appropriated trunk was not being used by a regular customer at the time it was seized by a preferred customer, the regular switching equipment was merely notified that this trunk is now being used on a priority call and is no longer available for regular customers as long as the priority call is in progress. If, however, a priorly established nonessential call was in progress on the trunk when the preferred customer seized the trunk, the regular customer would automatically be disconnected from the trunk, and the trunk would be made available for only the preferred customer.

Many of these latter arrangements can successfully be operated between two adjacent switching centers, each serving a preferred customer, where it is necessary to appropriate only one trunk in order to connect the two preferred customers together. Certain problems arise, however, when the preferred customer switching centers are remotely located and separated by one or more intermediate switching centers. Under these circumstances, the priority call must be established by commandeering a plurality of serially related trunks and connecting them in tandem between the two preferred customers. This may result in many regular customers suffering the inconvenience of having their conversations abruptly interrupted as the series of trunks are seized by the preferred customers. These intermediate trunks, incidentally, are often so-called "high priority" trunks since they frequently handle toll traffic from all other switching centers in the network and offer higher quality facilities for data transmission and the like.

A particularly egregious situation occurs when, the trunks are arranged to be commandeered in a cascade fashion by having each trunk seize the next trunk in the series, and the right-of-way call progresses to a point where all trunks but the last are seized only to discover that the essential call cannot be completed due to a trouble in the last link of the series. It is obvious that when this occurs, many regular customers will have unreasonably been disconnected and to no avail since the priority call could not be completed.

It is therefore one object of our invention to provide a priority communication arrangement for interconnecting preferred customers by commandeering preselected trunks from regular customers service wherein the control of the priority arrangement is effective to minimize the erroneous displacement of any regular customers that may be utilizing the selected trunks.

Another object of our invention is to safeguard against the possibility of abruptly disrupting regular customer calls in order to utilize the trunks commandeered from them for preferred customers unless a legitimate right-of-way call is initiated by a preferred customer.

A further object of our invention is to increase the reliability of prior communication arrangements by minimizing the possibility of falsely disconnecting the preferred customers from right-of-way calls in the event that trouble should develop in the right-of-way control facilities.

In accordance with one illustrative embodiment of our invention in a telephone network, two preferred customers are provided with a special arrangement which enables either customer to establish a direct priority connection to the other by commandeering preselected trunks from regular customer service.

The preferred customers are located at the extremities of the network, and each is served by a different local switching office for purposes of calling over the regular telephone network. The two local offices comprise the first and last in a series of offices serving the network, wherein the series also includes one or more toll offices interposed between the two local offices.

Each local office is linked to its adjacent toll office via a group of interoffice trunks, and similar interoffice trunk groups are furnished to link toll offices that are adjacent to each other in the series.

A regular customer call between the local offices at each end of the series is, therefore, completed over a connection including one trunk from each interoffice trunk group wherein the trunks are connected together in tandem by the switching equipment at the toll offices.

A right-of-way call requires a similar connection between the preferred customers; however, since trunks are to be used from the regular network, steps must be taken to give the preferred customers preferential access to the trunks. Certain trunks, therefore, are selected from these interoffice groups and associated with special equipment at each office where the trunks terminate. This special equipment is effective when actuated to seize an associated trunk whether or not it is being used by regular customers, make the trunk busy to subsequent calls, disconnect the trunk from its normal terminations and connect it directly through a similarly disconnected trunk in the preselected series.

To control the actuation of the special equipment located at the various offices where trunks are to be forcefully seized, the two preferred customers are provided with a common control channel. This channel links each preferred customer's local office with those toll offices where the trunks selected for the right-of-way call normally terminate.

The control channel is arranged so that either customer can initiate a priority call by transmitting a signal over the channel from his local office. The calling customer's signal traverses the length of the control channel, thereby checking its continuity to the called customer's office, prior to disconnecting any of the high priority trunks.

When the calling customer's signal is received at the called office, the called customer is alerted, and a signal is automatically returned over the channel to the calling customer's office.

At each intermediate toll office, after having first received a signal from the calling local office, and now receiving a signal from the called local office indicating that the control channel is continuous, the special equipment is actuated to seize the preselected trunks and serially interconnect them between the two preferred customers. Since both of the signals must be received in the intermediate offices before all the trunks are commandeered, and since the receipt of both signals indicates the continuity of the control channel, the over-all circuit availability is in effect, examined en masse rather than on a sequential or "step-by-step" basis.

If the signal initiated by the calling customer did not reach the called customer's office due to an inoperative control channel, the regular customers using the high priority trunks will not have their calls needlessly disrupted for a priority call that may not be completed due to the faulty control channel.

Signaling over the control channel in both directions is accomplished by arranging each toll office so that it can receive a signal from an adjacent office in one direction and verify that the signal is a valid signal associated with a right-of-way call before it forwards that signal to the other adjacent office in the opposite direction. By verifying the validity of signals at each toll office, any extraneous signals that may be introduced into the control facilities are prevented from being forwarded over the control channel and thus simulating a request for a right-of-way connection.

The local offices at the ends of the series are, of course, each arranged to originate signals only one direction (toward the other local office) either under control of the preferred customer thereat, or automatically upon receipt of a signal over the channel from the calling customer.

When the called preferred customer answers the right-of-way call, the equipment at his office assumes control of the signals that were automatically being returned over the control channel from his local office. The right-of-way connection will now remain established until both parties disconnect and remove the signals being sent from their respective local offices.

Should the control channel develop trouble when in its idle condition, the circuit is arranged to automatically establish the priority connection between the preferred customers or, in some instances, to actuate special alarms at the various offices. The exact action taken by the circuit under these circumstances depends on the nature and location of the trouble.

If, however, the control channel should develop a trouble while a right-of-way call is in progress, the right-of-way talking connection will remain established and not be severed until the parties have finished the conversation and they both disconnect.

One feature of our invention resides in a preferred customer communication arrangement utilizing a plurality of serially connected trunks that were commandeered from regular customers wherein means are provided for transmitting a signal, initiated by the calling customer, to ascertain the continuity of the control facilities prior to forceably seizing certain of these trunks in response to a return signal from the called customers' equipment.

Another feature of our invention is found in a priority communication arrangement serving preferred customers wherein a calling customer can initiate a request for a right-of-way connection by sending signals to the called customer, but the connection is established only when signals are returned from the called customers' equipment and wherein means are provided to maintain the established connection under control of signals from either customer.

A further feature of our invention resides in the means by which a right-of way circuit will automatically be established if trouble is encountered in the facilities used by the preferred customers for establishing a right-of-way connection.

These and other objects and features will become apparent from the following description with reference to the drawing, in which:

FIGS. 1 and 2 when arranged with FIG. 2 to the right of FIG. 1 depict, in block diagram fashion, one illustrative embodiment of our invention when used in a telephone switching network;

FIGS. 3 through 6 show a more detailed disclosure of the same embodiment of our invention which is illustrated by the block diagrams in FIGS. 1 and 2; and FIG. 7 shows the arrangement of FIGS. 3 through 6.

GENERAL DESCRIPTION

The arrangement and operation of the various components of this embodiment of our invention will be described in detail subsequently with reference to FIGS. 3 through 6. However, in order to first attain an over-all understanding of the invention as employed herein, a brief general description will now be given with reference to FIGS. 1 and 2.

*Arrangement of equipment*

FIGS. 1 and 2 when arranged with FIG. 2 to the right of FIG. 1 illustrate a telephone switching network comprising a plurality of switching centers which are interconnected via trunks.

To the left of FIG. 1 there is shown a local switching center designated "West." This switching center utilizes switching equipment 101 which can be any one of the many more familiar types of equipment such as step-by-step, crossbar, etc.

In addition, switching center "West" contains line equipment 102 and trunk equipment 103. Line equipment 102 performs the usual function of providing customers, such as regular customers 104 and 134, with access to switching equipment 101 for connection to other regular customers thereat or for connection over switch train 135 to trunk equipments 103 which have access over trunks 108 and 116 to other switching centers such as intermediate toll switching center "B" shown to the right in FIG. 1.

Intermediate toll switching center "B," as illustrated herein, contains toll switching equipment 105 which can be any one of the well-known types such as the system disclosed in Patent 2,868,884 granted to J. W. Gooderham et al. on January 13, 1959. Of course, it will be understood that for the purpose of this invention, switching center "B" need not be a toll switching center but could also be a local switching center such as switching center "West."

Connected to intermediate toll switching equipment 105 are various types of trunk equipments designated 106 and 107 which provide terminations for trunks interconnecting switching center "B" with other switching centers in the telephone network. For instance, trunk equipment 106 is connected over trunks 108 and 116 in trunk group 114 to switching center "West" thereby enabling customers at switching center "West" to be connected to other switching centers such as intermediate toll switching center "C" in FIG. 2 by utilizing trunk equipment 106 and "switching through" switching equipment 105 to trunk equipment 107 and out over trunks 109 and 117 in trunk group 115 to FIG. 2 and intermediate toll switching center "C."

It will be understood that what we have referred to as trunks may include physical paths, carrier lines, radio links and other similar types of communication channels.

For purposes of illustration, intermediate toll switching center "C" and local switching center "East" in FIG. 2 are assumed to be identical to the respective intermediate toll switching center "B" and local switching center "West" in FIG. 1. The general remarks directed toward the arrangement in FIG. 1 are, therefore, equally applicable to FIG. 2 and no further description of the arrangement of the equipments in FIG. 2 need be given at this time.

At local switching center "West" there is shown a preferred customer 110. Preferred customer 110 also has access to the regular trunking network; however, his line conductors 119 are arranged in a special manner by being connected through transfer and make busy circuit 111 and then over conductors 130 to one of the regular line equipments designated 102.

The transfer and make busy circuit 111, when actuated, functions to (1) disconnect the preferred customer line 119 from its associated line equipment 102 and make line equipment 102 appear busy to switching equipment 101; (2) commandeer a preselected trunk from regular service by disconnecting the trunk from its associated trunk equipment and making the trunk equipment busy to switching equipment 101; and (3) then interconnect the appropriated trunk with the preferred customer line by-passing the regular line, trunk and switching equipment at switching center "West."

A similar transfer and make busy circuit 211 is provided at local switching center "East" in FIG. 2 for preferred customer 210 and a preselected trunk terminating at that switching center in trunk equipment 203. Also, at each intermediate toll switching center, namely "B" and "C," where certain preselected trunks are to be commandeered from regular customer service for use on priority calls, similar transfer and make busy circuits 118 and 218 are provided and will be described later.

Although the arrangement set forth in this specific embodiment provides facilities for only two preferred customers, it will readily be appreciated by those skilled in the art that arrangements for more than two customers are possible without departing from the spirit and scope of our invention.

Let it now be assumed that preferred customers 110 and 210 have a mutual need for emergency right-of-way communication service. For the right-of-way talking channel, trunks will be selected from the regular telephone trunking network and arranged in a special manner so that a direct talking connection can be established between the two preferred customers using the conductors of these trunks, whether or not they are being used by regular customers. It will be noted from FIGS. 1 and 2 that a regular communication channel can be established between the regular customers served by the "East" and "West" switching centers by utilizing a trunk in each of the interoffice trunk groups 114, 115, and 215 and connecting the trunks together through the regular switching equipments 105 and 214 at intermediate switching centers "B" and "C" respectively. For right-of-way service between preferred customers 110 and 210, trunks can, therefore, be selected from these same trunk groups and arranged in a special manner so that they may be appropriated from the regular customers and used for the priority communication channel between the preferred customers.

For instance, trunk 116, which would normally be connected directly to trunk equipments 103 and 106, has been selected for the priority channel and is shown connected to trunk equipment 103 through transfer and make busy circuit 111 and over conductors 131 at switching center "West" and to trunk equipment 106 through transfer and make busy circuit 118 and over conductors 132 at intermediate toll switching center "B."

Similarly, trunk 117 is connected to trunk equipment 107 in FIGS. 1 and 207 in FIG. 2 through transfer and make busy circuits 118 and 218 and over conductors 133 and 233 at switching centers "B" and "C" respectively, and trunk 216 is connected to trunk equipments 203 and 206 in FIG. 2 through transfer and make busy circuits 218 and 211 and over conductors 232 and 234 at switching centers "C" and "West" respectively.

It can now readily be seen that when all of the transfer and make busy circuits, namely, 111, 118, 218 and 211 are actuated, the preferred customers' lines 119 and 219 and selected trunks 116, 117 and 216 are disconnected from their regularly associated line and trunk equipment, the disconnected equipments are rendered inaccessible to regular customers and the trunks are then connected in tandem to provide a direct "through" communication channel between the preferred customers which by-passes all of the regular line, trunk and switching equipment at each switching center.

To control commandeering of the preselected trunks for the above-described priority communication channel, a signaling and control channel is established between preferred customers 110 and 210 for their exclusive use. This channel comprises a chain of signaling and control circuits (one being located at each switching center) linked together by a series of signaling links wherein each link interconnects the signaling and control circuits of two adjacent switching centers. Each link is terminated at its adjacent switching centers to the west and east in carrier terminal equipment and these terminals are in turn are interconnected with the associated signaling and control circuits via send and receive loops. For example, at the extreme westerly portion of the signaling and control channel in FIG. 1 there is shown the signal and control circuits 113 and 122 for switching center "West" and intermediate toll switching center "B" respectively. These signaling and control circuits are linked together over signaling link 120 which includes two carrier terminals, one being designated "W" for the terminal toward the west and the other designated "E" for the terminal toward the east. Carrier terminal "W" at switching center West is connected to its associated signaling and control circuit 113 by west-east send loop 124 and east-west receive loop 125 while carrier terminal "E" at switching center "B" is connected to its associated signaling and control circuit 122 by west-east receive loop 127 and east-west send loop 126.

For this one specific embodiment of our invention we have illustrated a signaling link comprising frequency shift telegraph carrier arrangements such as that disclosed in Patent 2,667,536 granted to L. A. Gardner and J. L. Hysko on January 26, 1954. A more comprehensive description of the signaling links and their cooperative relationship with the signaling and control circuit will be given below with respect to the detailed description.

The signaling and control circuit at each switching center is effective in response to signals sent over its associated signaling links to control the actuation of a corresponding transfer and make busy circuit at their switching center.

Each preferred csutomer is furnished with a special signaling device for initiating a priority call. The signaling device for preferred customer 110 is represented by key 112 which is connected to signaling and control circuit 113 at the western end of the control channel. Preferred customer 210 has a similar key designated 212 and connected to signaling and control circuit 213 at his end of the channel.

*Establishing a priority call*

The operation of the signaling and control arrangements in this embodiment of our invention can best be understood if it is assumed that preferred customer 110 originates a right-of-way call to preferred customer 210. To initiate a call, preferred customer 110 actuates his key 112 indicating to signaling and control circuit 113 that a right-of-way connection is desired. Control circuit 113 acknowledges the request for right-of-way service by actuating its associated transfer and make busy circuit 111 which disconnects customer line 119 and trunk 116 from their respective line and trunk equipment and interconnects the line and trunk together regardless of whether the trunk was being used on another call. This function is accomplished by the operation of the PMT–W and PMTB–W relays shown in transfer and make busy circuit 111. In addition transfer and make busy circuit 111, by signaling over circuits 123, renders the preferred customer's regular line equipment 102 and the disconnected trunk equipment 103 unavailable to subsequent regular customer calls by informing switching equipment 101 that the facilities associated with these equipments are busy on a priority call.

For illustrative purposes, it has been assumed that a regular customer was busy talking on the trunk that was appropriated by preferred customer 110, when the right-of-way call was initiated. This is shown in FIG. 1 wherein regular customer 104 has his line extended over switch train 135, conductors 131 and through normal contacts of relay PMTB–W to trunk 116. When preferred customer 110 commandeers trunk 116 for a priority call, the regular customer's talking connection is preemptorily severed at the normal contacts of relay PMTB–W.

At the same time that signaling and control circuit 113 commandeers a trunk it also sends a "prepare" signal over west-east send loop 124 and thence over signaling link 120 where it is received by signaling and control circuit 122 via west-east receive loop 127. At signaling and control circuit 122, a check is then made to ascertain whether the received signal is a legitimate "prepare" signal and not the result of an electrical disturbance in signaling link 120.

In the case of carrier type signaling arrangements, such as those used in this embodiment, this electrical disturbance is sometimes referred to as a "hit" on the line.

If the signal is a legitimate "prepare" signal, signaling and control circuit 122 prepares the transfer and make busy circuit 118 for actuation and forwards a similar "prepare" signal over west-east send loop 128, signaling link 121 to FIG. 2 and west-east receive loop 229 to signaling and control circuit 222 at intermediate toll switching center "C."

A similar signal verification is made at toll center "C" and transfer and make busy circuit 218 thereat is prepared for operation before the "prepare" signal is forwarded over signaling link 220 to the next switching center, which in our illustration is local switching center "East."

At local switching center "East" the "prepare" signal is received on west-east receive loop 225 which causes signaling and control circuit 213 to actuate transfer and make busy circuit 211. When transfer and make busy circuit 211 is actuated it disconnects trunk 216 and line 219 from their regular equipment, interconnects trunk 216 with the preferred customer's line 219 and informs local switching equipment 201 over circuits 223 that the facilities associated with the disconnected trunk and line equipments are busy on a priority call. Furthermore, signaling and control circuit 213 alerts customer 210 that he is wanted for an essential call by applying a ringing signal to his line 219.

While the called preferred customer 210 is being alerted, signaling and control circuit 213 functions to return an "execute" signal back over the control channel to cause the trunks at the intermediate toll centers to be commandeered. This signal is sent over east-west send loop 224, signaling link 220 and east-west receive loop 227 to signaling and control circuit 222 in intermediate toll switching center "C." At signaling and control circuit 222 in toll center "C" a check is first made to determine if the "execute" signal is legitimate after which the "execute" signal is retransmitted to toll center "B" over east-west send loop 226, signaling link 121 and east-west receive loop 129 to signaling and control circuit 122. The "execute" signal is again verified and thereafter repeated in a similar manner at each successive switching center in the series to the last center which in our illustration is local switching center "West."

At the intermediate switching centers "B" and "C" after having first received a "prepare" signal on their respective west-east receive loops and now receiving an "execute" signal on their corresponding east-west receive loops, the associated transfer and make busy circuits 218 and 118 are actuated to disconnect the preselected trunks 216, 117, and 116 from their regular trunk equipments 206, 207, 107 and 106 and serially interconnect the trunks together forming a direct communication path between preferred customers 110 and 210 using customer lines 119 and 219 and trunks 116, 117 and 216.

Since customer 110 had originated the call, the "execute" signal was returned from called customer 210 to toll center "C" first causing the trunks thereat to be seized before the trunks were seized at toll center "B."

Had preferred customer 210 originated the call, a similar "prepare" signal would have been sent from his local switching center "East" to local switching center "West" and the "execute" signal returned from local switching center "West" to local switching center "East" in a similar manner causing the disconnections (of regular customers) to occur at each intermediate switching center. However, the trunks at the intermediate switching centers would have disconnected in the reverse sequence with the trunks at switching center "B" being disconnected from regular service prior to those at switching center "C."

It can now readily be seen that a signal must traverse the entire length of the signaling and control channel, thus checking the continuity thereof, prior to commandeering high priority trunks at any intermediate toll switching center.

In addition, as will be shown with reference to the detailed description, further safeguard features have been incorporated in this system whereby trouble on any send or receive loop will automatically cause the equipment to establish the right-of-way communication channel and alert both preferred customers.

In the case of a carrier failure in any signaling link certain alarms will be actuated to alert the maintenance forces at the appropriated switching centers, but the preselected trunks will not falsely be commandeered if the right-of-way circuit is idle nor will the preferred customers be falsely disconnected if they are communicating over the right-of-way circuit at the time of a carrier failure.

DETAILED DESCRIPTION

*Arrangement of equipment*

Figure 7:
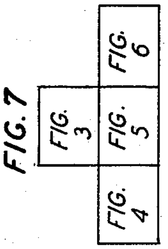

Turning now to FIGS. 3 through 6 as arranged according to FIG. 7, a more detailed description of the specific exemplary embodiment of our invention will be given.

Figure 1:
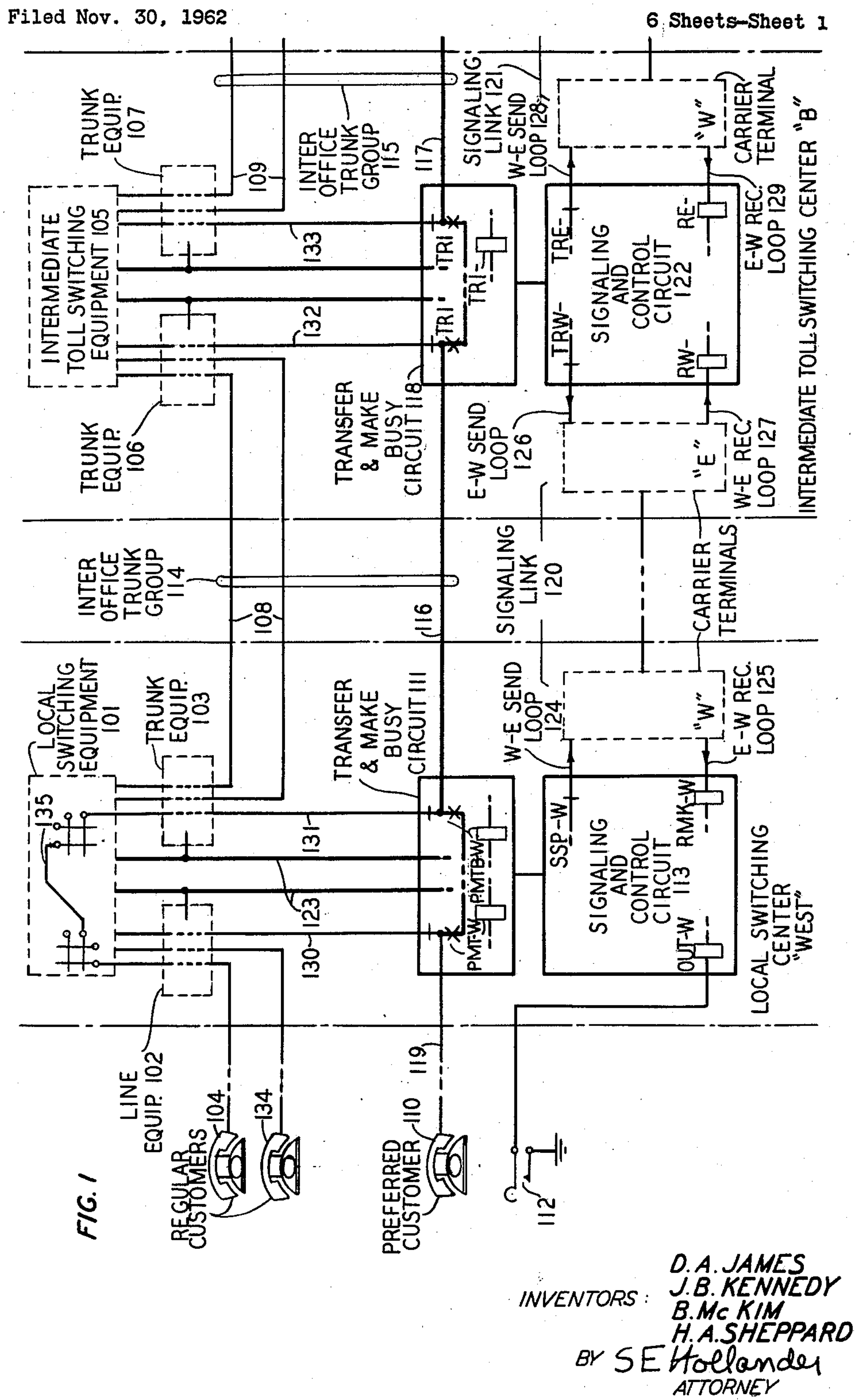
Figure 2:
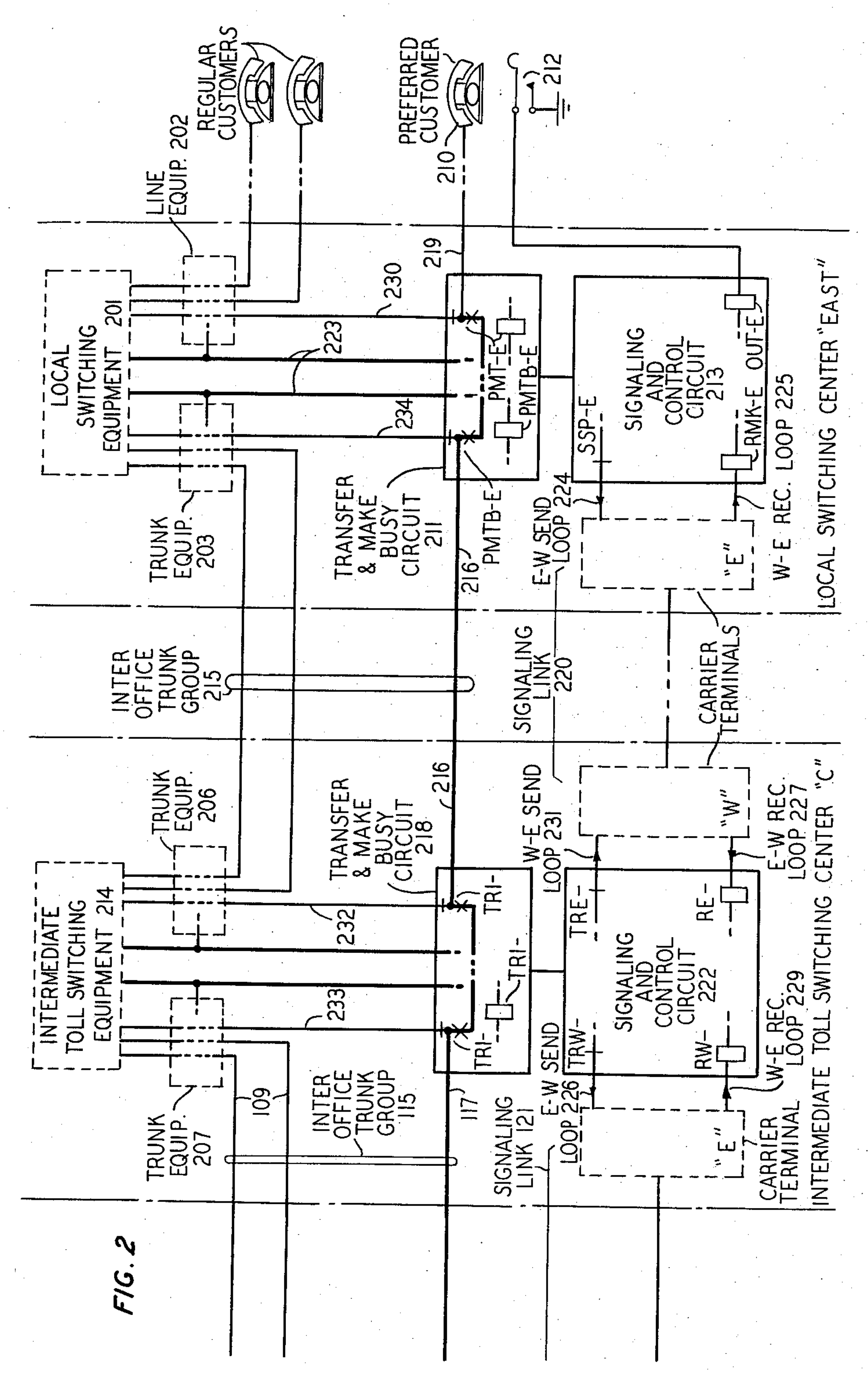

Wherever possible the reference designations that were used in the block diagram of FIGS. 1 and 2 will be used for the same equipment which has been shown in more detail in FIGS. 3 through 6.

Figure 4:
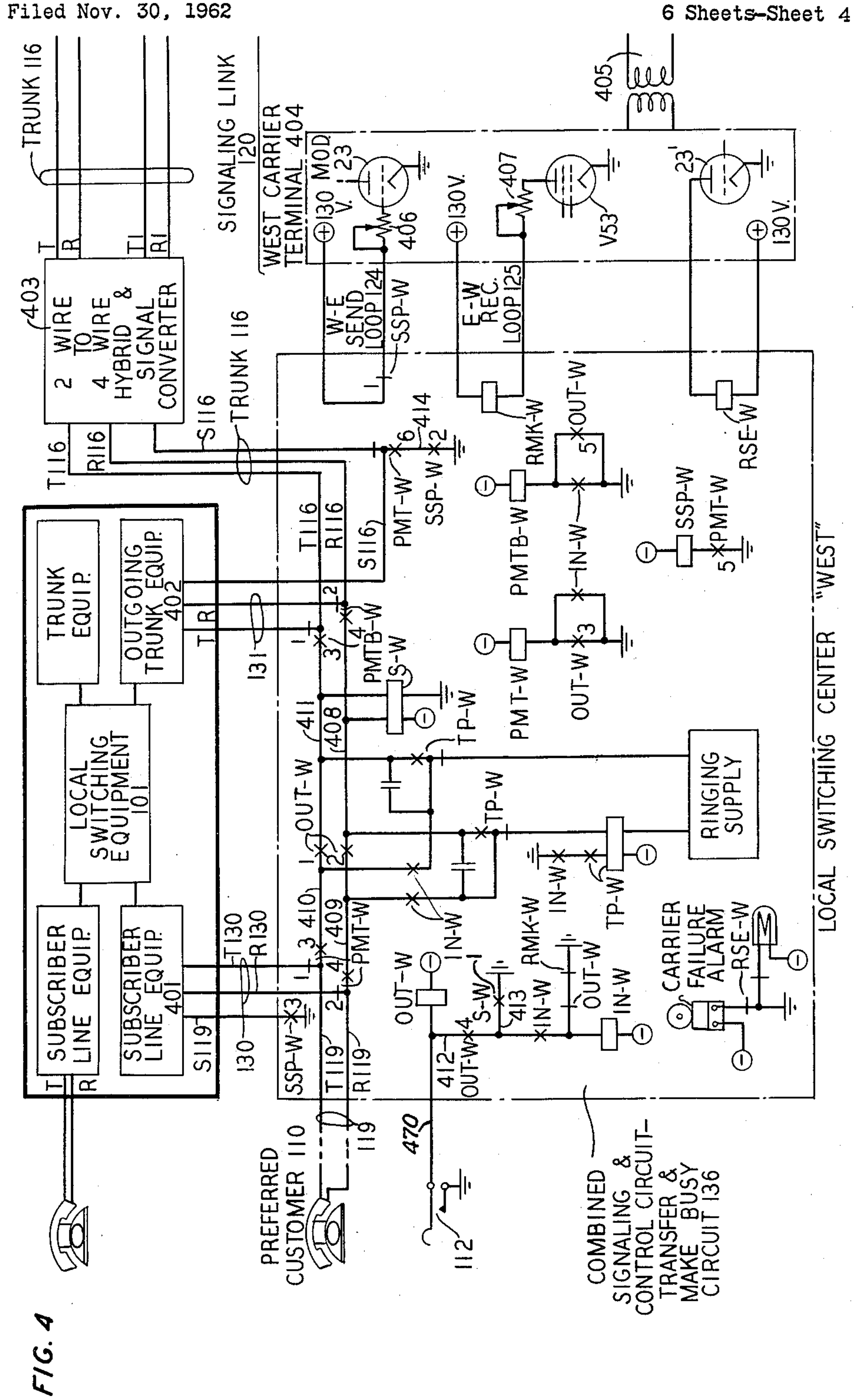
Figure 6:
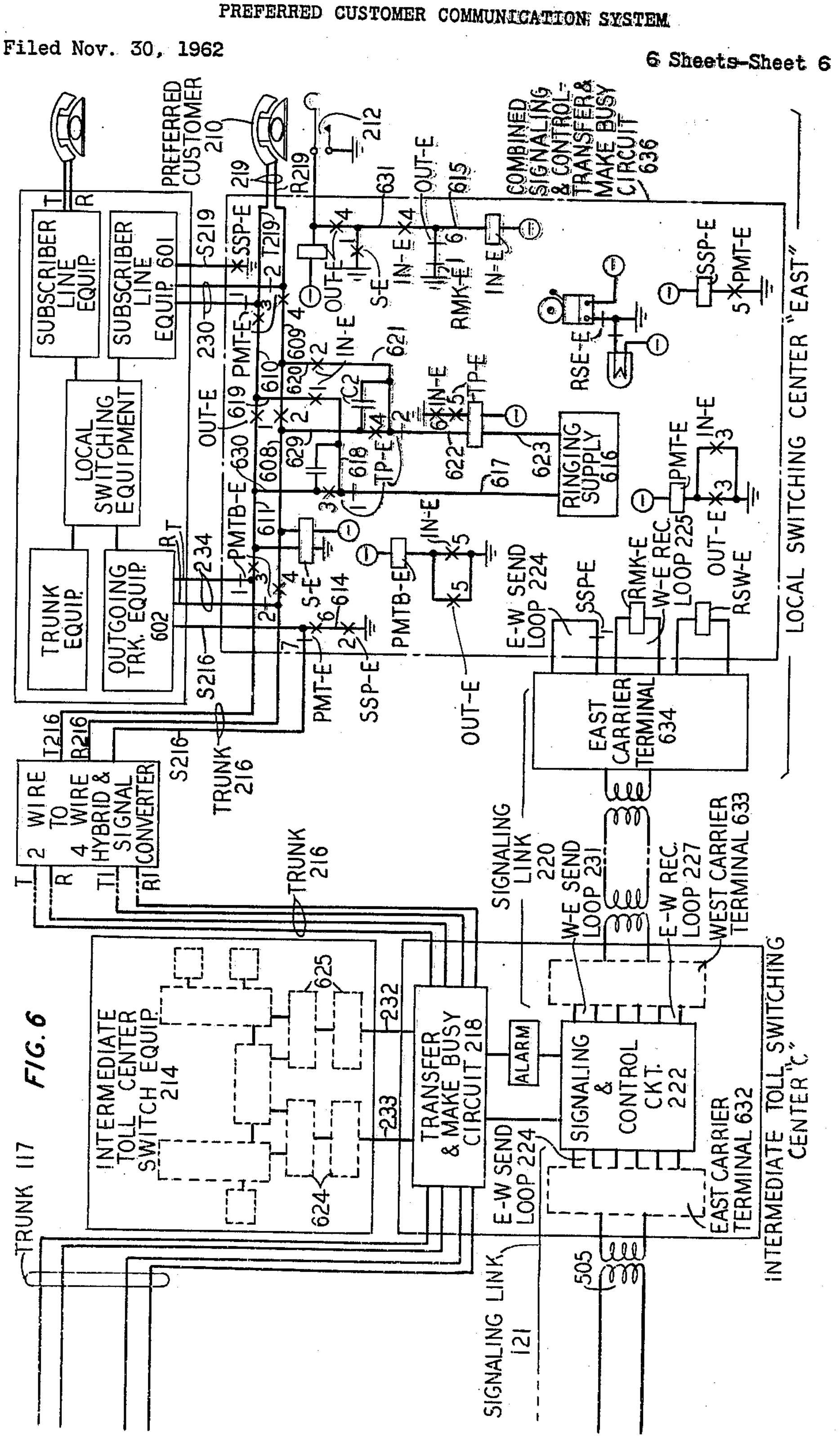

It should be noted here that FIG. 4 shows local switching center "West" including west carrier terminal 404 and that the right hand portion of FIG. 6 shows local switching center "East" including east carrier terminal 634. The right hand portion of FIG. 6 represents a mirror image of FIG. 4 except for the detailed circuitry of east carrier terminal 634 which has been omitted from FIG. 6 for simplicity.

Figure 3:
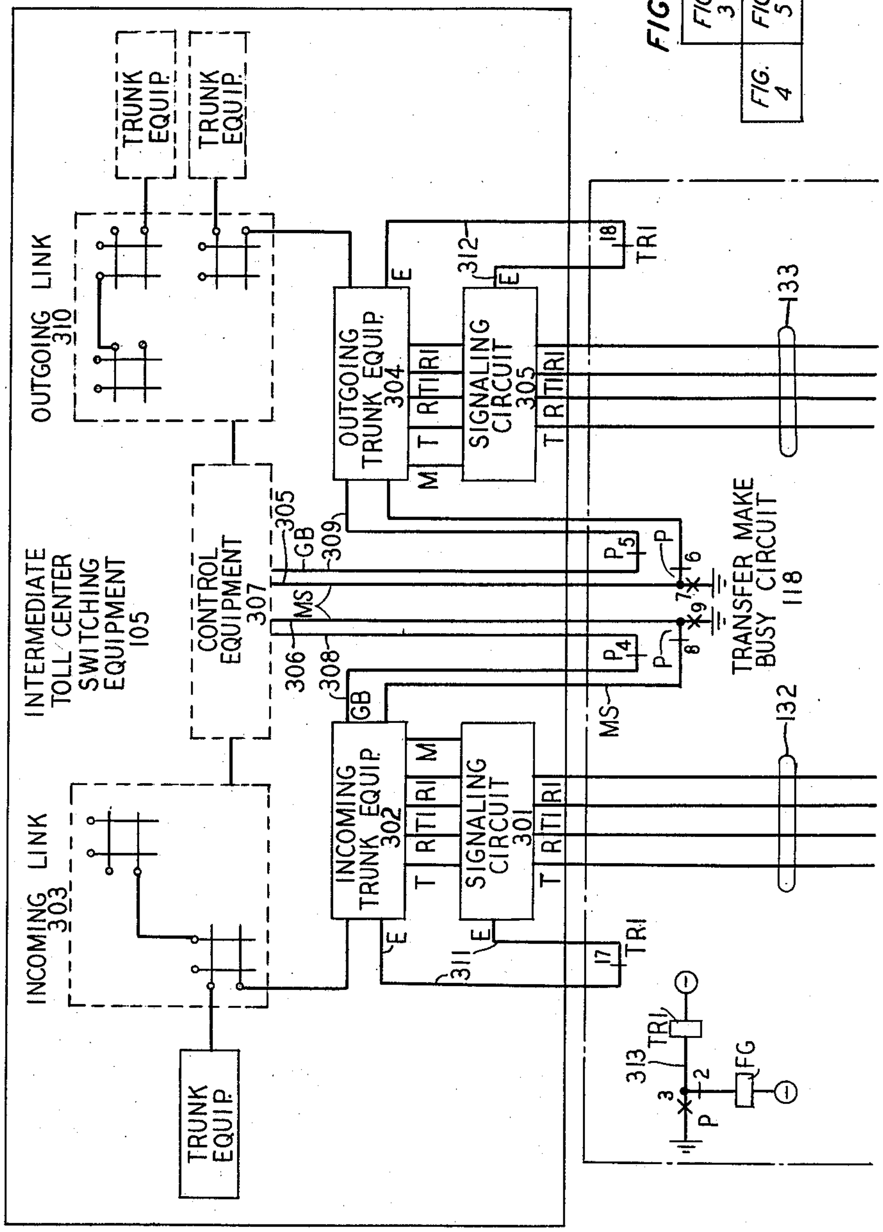
Figure 5:
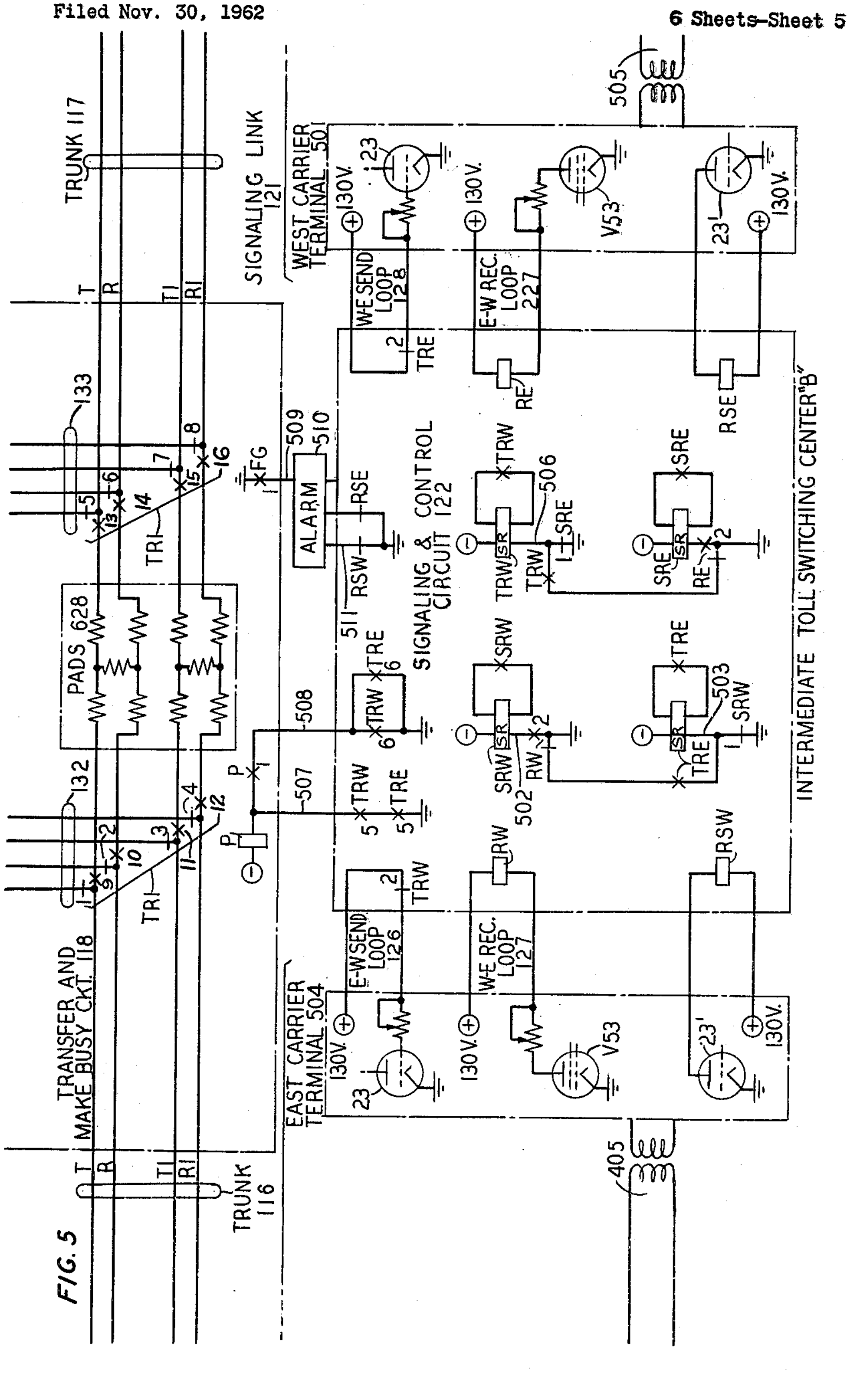

Attention should also be directed to FIGS. 3 and 5 which show intermediate toll switching center "B" in detail and also the left hand portion of FIG. 6 which shows intermediate toll switching center "C," but in block diagram form. It will be understood that the block diagram of FIG. 6 represents that equipment which is shown in greater detail in FIGS. 3 and 5.

Wherever possible the ensuing description of the operation of the circuit will be directed to those figures disclosing a more detailed schematic, and it should be understood that the description with reference to the detailed schematic is equally applicable to the comparable equipment represented in outline form to preserve clarity.

Let it be assumed, as was done with respect to the general description, that preferred customer 110 in FIG. 4 and preferred customer 210 in FIG. 6 have a mutual need for emergency right-of-way communication service.

In FIG. 4 preferred customer 110 would have his line 119, including tip conductor T119 and ring conductor R119, connected through normal contacts 1 and 2 respectively of transfer relay PMT–W and over conductors T130 and R130 to line equipment 401 which has been assigned to preferred customer 110 for regular telephone service.

It is over these conductors and equipment 401 that preferred customer 110 has access to local switching equipment 101 for originating and receiving calls via the regular telephone switching network.

In addition, preferred customer 110 has his sleeve conductor S119 connected through normally open contacts 3 of relay SSP–W to ground. When relay SSP–W operates closing its contacts 3, sleeve conductor 119 is grounded indicating to line equipment 401 and switching equipment 101 that preferred customer 110 is busy on a right-of-way call.

It will be remembered from the general description that a direct communication channel is required between the preferred customers, and that this was accomplished by selecting trunks from the regular interoffice trunking network and arranging them in a special manner so that they may be disconnected from their regular equipment and interconnected together to form a right-of-way communication channel between the two preferred customers.

In FIG. 4 trunk 116 has been selected since it is in the proper trunk route which can ultimately be connected to local switching center "East" serving preferred customer 210. The talking conductors T116 and R116, which would normally be connected directly to outgoing trunk equipment 402 at one end of the trunk, are now connected through normally closed back contacts 1 and 2 of transfer relay PMTB–W and over conductors 131 to trunk equipment 402.

For illustrative purposes it has been assumed that outgoing trunk equipment 402 is a two-wire outgoing trunk using reverse battery supervision. This trunk, when used in the regular telephone network, is connected to intermediate toll switching center "B" which is a four-wire toll switching point. It, therefore, becomes necessary to use an arrangement such as the two-wire to four-wire hybrid and signal converter circuit represented by rectangle 403. This signal converter is used to convert reverse battery supervision over the two-wire trunk to single frequency signaling over the four-wire trunk and vice versa.

A description of the various types of signaling, including single frequency signaling, can be found in an article by C. Breen and C. A. Dahlbom entitled "Signaling Systems for Control of Telephone Switching" and published in volume XXXIX, No. 6 of the Bell System Technical Journal (1960).

At intermediate toll switching center "B" the four talking conductors T, R, T1 and R1 at the other end of trunk 116 are connected through normal back contacts 1, 2, 3 and 4 respectively of transfer relay TR1, over conductors 132 to signaling circuit 301 in FIG. 3 and thence through incoming trunk equipment 302 where they are extended to incoming link 303. Incoming link 303 furnishes trunk 116 and other incoming trunks with access to other switching centers in the network via trunks connected to outgoing link 310 of toll switching center "B."

Signaling circuit 301 in FIG. 3 can be any one of the many well known types of signal converters used for converting the single frequency signals received over the four-wire trunk, to D.C. signals on leads "E" and "M" of incoming trunk equipment 302. A signal converter typical of the one illustrated by signaling circuit 301 in FIG. 3 is disclosed in Patent 2,765,371 of W. W. Fritchi and A. Weaver of October 2, 1956.

Like incoming trunk equipment 302, outgoing trunk equipment 304 in FIG. 3 has its talking conductors T, R, T1 and R1 connected through a signaling circuit 305, over conductors 133 and through normal back contacts 5, 6, 7 and 8 respectively of transfer relay TR1 and thence to intermediate toll switching center "C" in FIG. 6 over trunk 117. At intermediate toll switching center "C" there is provided a transfer and make busy circuit represented by the rectangle designated 218 which is similar to the transfer and make busy circuit 118 that is shown in detail in FIG. 3 and FIG. 5. Transfer and make busy circuit 218 functions to disconnect the other end of trunk 117 and one end of trunk 216 from their regular equipment at toll center "C" and interconnect the trunks together as does circuit 118 and its associated trunks at toll center "B."

Trunk 216 in FIG. 6 has been selected for the right-of-way communication path between intermediate toll switching center "C" and local switching center "East" and has its one end connected through back contacts of transfer relay PMTB–E in a manner similar to trunk 116 at its associated transfer relay PMTB–W at local switching center "West" in FIG. 4.

It should also be noted that preferred customer 210 in FIG. 6 also has his line conductors 219 connected through contacts of his associated transfer relay, PMT–E, in a manner similar to the line conductors 119 for preferred customer 110 in FIG. 4.

It will be recalled from the general description that preferred customers 110 and 210 also require a signaling and control channel for their exclusive use and that this channel is made up of a chain of signaling and control circuits linked together by a series of signaling links interconnecting the switching centers at which the trunks terminate wherein each link corresponds to a selected interoffice trunk.

At local switching centers "West" and "East" in FIGS. 4 and 6 the signaling and control circuits and the transfer and make busy circuits that were represented by separate rectangles in FIGS. 1 and 2 have been combined for convenience and shown in the captioned rectangle 136 at switching center "West" and rectangle 636 at switching center "East."

Signaling and control circuits 122 and 222 at the intermediate toll centers of FIGS. 3, 5 and 6, however, are still shown separately from their associated transfer and make busy circuits 118 and 218 and a more detailed description of the operation of these control circuits will be given below with reference to the establishment of a priority call.

For purposes of illustration in this specific embodiment, we have utilized a frequency shift telegraph carrier system for signaling between the signaling and control circuits at each switching center. A carrier system such as that disclosed in the aforementioned patent granted to Gardner and Hysko has been found to function satisfactory, but many other signaling arrangements may readily be utilized. To simplify the instant disclosure the carrier terminals have been represented by a minimum amount of circuitry illustrating only those portions of the sending, receiving and supervisory circuitry which are necessary for a full understanding of our invention. This circuitry is disclosed in full and described in detail in the Gardner-Hysko patent and is considered to be incorporated here by reference as though set forth in full detail herein.

It will be recalled that the Gardner-Hysko patent disclosed a frequency shift telegraph carrier system using separate frequencies for "marking" and "spacing" signals. When the send loop at the near terminal of a telegraph carrier system is closed, a frequency indicative of a marking signal is sent over the carrier line to the distant terminal where it is received and, after passing through various stages at that carrier terminal, causes a closure in the distant terminal receive loop. When the near terminal send loop is opened, however, the near terminal causes a mark to space frequency shift to be transmitted to the distant terminal opening the distant terminal receive loop. Each system in the instant disclosure is arranged for independent transmission of either spacing or marking signals in both directions (east to west or west to east) at the same time.

The telegraph carrier system between local switching center "West" and intermediate toll switching center "B" is designated signaling link 120 and is represented by west carrier terminal 404 in FIG. 4 and east carrier terminal 504 in FIG. 5 interconnected by carrier line 405. To control frequency shift signals in the west to east direction, west carrier terminal 404 is provided with west-east send loop 124 comprising a 130 volt positive potential source connected through normal contacts 1 of the send space relay SSP–W and through potentiometer 406 to the grid of modulator tube 23. With the right-of-way circuit normal i.e., contacts 1 of relay SSP–W closed, tube 23 will conduct causing an outgoing marking signal to be sent over carrier line 405 to east carrier terminal 504, and when contacts 1 of relay SSP–W are opened causing tube 23 to cut off, an outgoing spacing signal will be sent to east carrier terminal 504.

The east-west receive loop 125 at west carrier terminal 404 in FIG. 4 comprises a 130 volt positive potential source connected through the winding of the receive mark relay RMK–W and through potentiometer 407 to the anode of tube V53. Tube V53 conducts when carrier terminal 404 is receiving a marking signal from east carrier terminal 504 thereby operating relay RMK–W; however, when a spacing signal is received by carrier terminal 404, tube V53 is cut off thereby releasing relay RMK–W.

The remaining signaling links 220 and 121 are arranged in a similar manner with a "west" carrier terminal at each of their respective switching centers to the west and an "east" carrier terminal at each of their respective switching centers to the east and each carrier terminal has its send and receive loops connected to the signaling and control facilities at the switching center where the carrier terminal is located.

When the signaling and control channel of the right-of-way system is normal i.e., before either of the preferred customers has initiated a right-of-way call, all carrier terminal send loops will be closed and each carrier terminal will be sending a steady marking signal over its carrier line to the associated carrier terminal at the other end of the line in the next adjacent switching center to hold a receive loop relay in the signaling and control circuit thereat operated. At local switching center "West," for instance, receive mark relay RMK–W is held operated by west carrier terminal 404 while at local switching center "East" receive mark relay RMK–E is held operated by east carrier terminal 634. Similarly, at each intermediate toll switching center an RW and an RE relay in the signaling and control circuit are held operated by marking signals being sent from the next adjacent switching center to the west and east respectively.

*Calling customer initiates a priority call*

Now let it be assumed that preferred customer 110 desires to establish a direct private communication channel to preferred customer 210 by using this right-of-way arrangement to commandeer preselected trunks from the regular telephone trunking network and, if necessary, force any existing calls on these trunks to be disconnected.

Preferred customer 110 initiates the call by removing his receiver and momentarily operating key 112 in FIG. 4. Key 112 connects ground over conductor 470 and through the winding of relay OUT–W to battery operating that relay. At contacts 1 and 2, relay OUT–W prepares for the connection of customer line conductors T119 and R119 to trunk conductors T116 and R116, and at contacts 3, relay OUT–W completes an obvious circuit for operating transfer relay PMT–W.

Relay PMT–W, when operated, opens its back contacts 1 and 2 to disconnect preferred customer 110 from his regular line equipment 401 and closes its front contacts 3 and 4 to complete a circuit for operating supervisory relay S–W. This circuit, which also furnishes talking battery to customer 110, can be traced from battery, through the left hand winding of relay S–W, over conductor 408, through contacts 2 of relay OUT–W, over conductor 409, through contacts 4 of relay PMT–W, over conductor R119 through switchhook contacts (not shown) at the station equipment of preferred customer 110, back over conductor T119, through contacts 3 of relay PMT–W, over conductor 410, through contacts 1 of relay OUT-W, over conductor 411 and through the right hand winding of relay S–W to ground.

Relay S–W, in operating, completes a locking path for relay OUT–W which can be traced from battery, through the winding of the OUT–W relay, over conductor 412, through contacts 4 of the OUT–W relay, over conductor 413 and through contacts 1 of relay S–W to ground.

At its contacts 5, the previously operated relay PMT–W completes an obvious operating circuit for send space relay SSP–W which operates causing the following operations to occur: (1) at its contacts 1, relay SSP–W opens west-east send loop 124 thereby causing west carrier terminal 404 to transmit a "prepare" signal comprising a frequency shift from mark to space over carrier line 405 to east carrier terminal 504 in FIG. 5; (2) at its contacts 3, relay SSP–W places ground on sleeve conductor S119 to subscriber line equipment 401 thereby indicating to local switching equipment 101 that preferred customer 110 is now busy on a right-of-way call; and (3) at its contacts 2 relay SSP–W connects ground over conductor 414, through contacts 6 of relay PMT–W and over sleeve conductor S116 to outgoing trunk equipment 402 thereby making trunk equipment 402 busy so that it can no longer be seized by switching equipment 101 for subsequent regular customer calls over the regular telephone switching network.

Relay OUT–W, in operating, closes its contacts 5 to complete an operating circuit for transfer relay PMTB–W which operates. When transfer relay PMTB–W operates, it opens its back contacts 1 and 2 and closes its front contacts 3 and 4 thereby disconnecting trunk conductors T116 and R116 from outgoing trunk equipment 402 and reconnecting these conductors to line conductors 119 of calling preferred customer 110. Calling preferred customer 110 now has his station equipment extended over a pair of talking conductors including T119, R119, 408–411, T116 and R116 to the four-wire hybrid and signal converter 403, and talking battery is being supplied to preferred customer 110 from the windings of his supervisory relay S–W.

*Vertification and forwarding of "prepare" signal*

Turning now to FIG. 5, it will be recalled that receive west relay RW in signaling and control circuit 122 is held operated as long as east carrier terminal 504 is receiving a steady marking signal from west carrier terminal 404. With the RW relay in FIG. 5 held operated during a steady marking signal, a circuit is completed for operating relay SRW. This circuit can be traced from ground, through contacts 2 of relay RW, over conductor 502 and through the winding of relay SRW to battery. As long as a marking signal is being received by east carrier terminal 504, receive relay RW will remain operated holding relay SRW operated.

However, when preferred customer 110 in FIG. 4 initiated the right-of-way call, the above described sequence of operations took place resulting in the operation of send space relay SSP–W which caused a frequency shift from mark to space at west carrier terminal 404. This frequency shift or "prepare" signal was transmitted over carrier line 405 and received by east carrier terminal 404 where it causes tube V53 at that terminal to cut-off, thereby opening west-east receive loop 127 and releasing relay RW in signaling and control circuit 122.

When relay RW releases, it opens, at its contacts 2, the operating circuit for slow release relay SRW, which begins to release. After slow release relay SRW releases, it completes a circuit through its contacts 1, over conductor 503 and through the winding of transmit east relay TRE, operating the TRE relay. Relay TRE in operating, opens at its contacts 2, the west-east send loop 128 causing west carrier terminal 501 to send a mark to space frequency shift over carrier line 505 to east carrier terminal 632 thereby forwarding the "prepare" signal to intemediate toll switching center "C" in FIG. 6.

Relay SRW in FIG. 5 has been made slow to release to time the interval that receive relay RW remains released before the "prepare" signal is forwarded to the next switching center. This prevents a momentary false frequency shift signal, as a result of a "hit" or other disturbance on the signaling link, from being forwarded to the next switching center and thereafter being repeated to each switching center as though a legitimate right-of-way service request had been initiated by one of the preferred customers. In other words, the spacing signal must be present and the RW relay released for a predetermined duration before the frequency shift from mark to space is forwarded to the next switching center.

Relay TRE in operating, also closes its contacts 5 to partially close operating circuit for relay P thereby preparing transfer and make busy circuit 118 for subsequent actuation.

With transmit east relay TRE operated, west carrier terminal 501 is now sending spacing signals to east carrier terminal 632 at intermediate toll switching center "C" in FIG. 6, and relays in signaling and control circuit 222 which are similar to relays RW, SRW and TRE in signaling and control circuit 122 of FIG. 5, open west-east send loop 231, causing a similar frequency shift to be forwarded from west carrier terminal 633 at switching center "C" to the next succeeding east carrier terminal. This sequence of operations consisting of (1) receiving a "prepare" signal, (2) checking that the received signal is of a proper duration which is indicative of a legitimate "prepare" signal, and (3) forwarding the "prepare" signal to the next adjacent switching center is repeated until the signaling and control equipment at each intermediate switching center has prepared its associated transfer and make busy circuit for operation and the "prepare" signal has been forwarded to the last switching center in the series, as in the instant disclosure, where the signal is forwarded to local switching center "East."

*Ringing the called preferred customer*

At local switching center "East," east carrier terminal 634 is now receiving a spacing signal from intermediate toll switching center "C," and west-east receive loop 225 is opened releasing receive mark relay RMK–E. Relay RMK–E, in releasing, completes a circuit for operating relay IN–E. This circuit can be traced from ground, through contacts 1 of relay RMK–E, through contacts 6 of relay OUT–E, over conductor 615 and through the winding of relay IN–E to battery.

In operating, relay IN–E performs the following functions: (1) at its contacts 1 and 2 prepares circuits for connecting ringing supply 616 to the T219 and R219 conductors serving preferred customer 210; (2) at its contacts 3, the IN–E relay completes an operating circuit for transfer relay PMT–E which operates; (3) at its contacts 4, relay IN–E prepares its own locking circuit; and (4) at its contacts 5 relay IN–E completes an obvious circuit for operating transfer relay PMTB–E which operates.

Relay PMTB–E, in operating, opens its contacts 1 and 2 to disconnect trunk 216 from its associated trunk equipment 602. Relay PMTB–E also closes its contacts 3 and 4 in preparation for connecting the talking conductors of trunk 216 through to customer line conductors 219.

When relay PMT–1 operated, a circuit was completed for connecting ringing supply 616 over line conductors 219 to preferred customer 210 to ring his station ringer. This circuit can be traced from ringing supply 216, over conductor 617, through contacts 1 of ringing trip relay TP–E, over conductor 618, through contacts 1 of relay IN–E, over conductor 619, thence over conductor 610, through contacts 3 of relay PMT–E, over tip conductor T219, through the station ringer (not shown) for preferred customer 210, back over ring conductor R219, through contacts 4 of relay PMT–E, over conductors 609 and 620, through contacts 2 of relay IN–E, over conductor 621, through contacts 2 of relay TP–E, over conductor 622 and through the left hand winding of ringing trip relay TP–E and thence over conductor 623 to complete the circuit at ringing supply 616. Ringing supply 616 may be connected to the regular central office ringing source or to a specially coded ringing source depending on the local requirements of the preferred customers.

In addition, relay PMT–E closes its contacts 5 to complete an obvious operating circuit for send space relay SSP–E. Relay SSP–E operates and completes a circuit for making outgoing trunk equipment 602 busy by connecting ground through its own contacts 2, over conductor 614, through contacts 6 of relay PMT–E and over sleeve conductor S216 to outgoing trunk equipment 602. Relay SSP–E also grounds sleeve conductor S219 to make subscriber line equipment 601 appear busy to regular customer calls and opens east-west send loop 224 to initiate the return of an "execute" signal back over the control channel to toll switching center "C." The "execute" signal is a frequency shift from mark-to-space initiated at east carrier terminal 634 and transmitted to west carrier terminal 633 where east-west receive loop 227 is opened to release a receive east relay (RE) in signaling and control circuit 222. This RE relay has not been shown but is similar to the RE relay connected to east-west receive loop 227 in FIG. 5.

At this point in establishing the right-of-way connection both the calling and called customer lines have been disconnected from their regular line equipments, the called customer's station is being rung and a "prepare" signal has traversed the signaling channel from the calling to the called customer to prepare the transfer and make busy circuit at each intermediate switching center for actuation for the subsequent commandeering of the preselected trunks from regular service.

*Return of "execute" signal over control channel*

Having thus verified the continuity of the signaling channel, by sending a "prepare" signal the length of the channel, an "execute" signal can now be returned from the called customer's equipment to complete the actuation of each intermediate transfer and make busy circuit. This "execute" signal will be in the form of a spacing signal transmitted from east to west over each of the signaling links beginning with the one nearest to the called customer.

It will be remembered from the description of the drawing that the diagram in FIG. 6 representative of intermediate toll switching center "C" contains equipment similar to that shown in the detailed schematic of FIGS. 3 and 5. To simplify the description it will be assumed that the "execute" signal returned from local switching center "East" was received at intermediate toll switching center "C" and, after certain operations took place at that toll center, the "execute" signal (spacing signal) was forwarded over signaling link 121 to west carrier terminal 501 at intermediate toll switching center "B" in FIG. 5. The operations that took place at intermediate toll switching center "C" causing the "execute" signal to be forwarded to toll center "B" are identical to the operations now to be described with respect to intermediate toll switching center B in FIG. 3 and FIG. 5.

The receipt of a spacing signal ("execute" signal) at west carrier terminal 501 causes receive east relay RE in FIG. 5 to release. Relay RE, in releasing opens its contacts 2 to interrupt the operating circuit for relay SRE which is a slow release relay similar to the SRW relay. Relay SRE was held operated by relay RE as long as west carrier terminal 501 was receiving marking signals, but once relay RE releases, relay SRE performs the same timing functions with respect to frequency shift signals received in the east-west direction as relay SRW did with respect to frequency shift signals received in the west to east direction.

Relay SRE releases after an appropriate time interval to close ground through its contacts 1, over conductor 506 and through the winding of transmit west relay TRW to battery operating the TRW relay. The TRW relay opens its contacts 2 thereby opening the send loop in the carrier system transmitting to the next adjacent switching center to the west which is local switching center "West."

Relay TRW, in releasing also completes a circuit for operating relay P in transfer and make busy circuit 118. This circuit can be traced from ground through contacts 5 of previously operated relay TRE, through contacts 5 of relay TRW, over conductor 507 and through the winding of relay P to battery. Relay P, in operating, closes a locking circuit through its contacts 1 and over conductor 508 to ground through contacts 6 of either the TRE or TRW relay.

In addition, relay P closes its contacts 7 and 9 to apply a ground on marker sleeve leads 305 and 306, and at contacts 4 and 5, interrupts group busy leads 308 and 309 thereby making trunk circuits 302 and 304 busy by indicating to common control equipment 307 that these trunks are unavailable for regular service.

Furthermore, relay P closes its contacts 3 to connect ground over conductor 313 and through the winding of transfer relay TR1 in FIG. 3 to battery operating relay TR1. Transfer relay TR1, when operated, causes the following operations to occur: (1) opens its contacts 1 through 4 to disconnect the talking conductors T, R, T1 and R1 of trunk 116 from signaling circuit 301 and incoming trunk equipment 302; (2) opens its contacts 5 through 8 to disconnect the talking conductors T, R, T1 and R1 of trunk 117 from signaling circuit 305 and outgoing trunk equipment 304; (3) closes its contacts 9 through 16 to interconnect the talking conductors of trunks 116 and 117 with each other via pads 628 which are used to simulate the transmission loss that would normally be encountered had the trunks been connected together via the regular switch train including incoming link 303 and outgoing link 310; and (4) opens its contacts 17 and 18 to open "E" leads 311 and 332 respectively thereby signaling trunks 302 and 304 to disconnect if the trunks are currently being used on regular customer calls.

Referring now to FIG. 6, and particularly to that portion of FIG. 6 representing intermediate toll switching center "C," it will be remembered that toll switching center "C" was the first center to receive the "execute" of spacing signal as it was automatically transmitted back over the control channel from the called customer's equipment in FIG. 6. The receipt of a spacing signal at west carrier terminal 633 causes east-west receive loop 227 to open, releasing relay RE (not shown) in signaling and control circuit 222. The release of relay RE in signaling and control circuit 222 causes relays in that circuit (similar to relays SRE and TRW in signaling and control circuit 122) to function and operate relays in transfer and make busy circuit 218 (similar to relays P and TR1 in transfer and make busy circuit 118). The operation of these relays in transfer and make busy circuit 218, however, disconnect trunks 117 and 216 from their respective equipments 624 and 625 and connect these trunks together through pads in transfer and make busy circuit 218 (not shown) similar to pads 628 in FIG. 5.

When the relay in signaling and control circuit 222, which is equivalent to relay TRW in FIG. 5, operates it opens east-west send loop 224 to forward the "execute" signal to intermediate toll switching center "B" causing the forceful seizure of the trunks 116 and 117 thereat to occur. The seizure of trunks 116 and 117 at intermediate switching center "B" was described in detail above and need not be reiterated.

It can now readily be seen that when the calling preferred customer initiates a right-of-way call, his line conductors and conductors of a local trunk are disconnected from regular service and connected together. In the meantime, a "prepare" signal is sent over the first signaling link to the first intermediate toll switching center to prepare a circuit for commandeering additional trunks thereat. When the first intermediate switching center has been prepared the "prepare" signal is forwarded over a similar signaling link to the next intermediate switching center to prepare similar equipment at that switching center where the signal is forwarded until each switching center has been prepared and the "prepare" signal has been forwarded to the called customer's local switching center. At the called customer's switching center the customer's line conductors and conductors of a local trunk are also disconnected from regular service and connected together. In addition, an "execute" signal is automatically sent back over each signaling link to complete the appropriation of the preselected trunks at the intermediate switching centers starting with the switching center farthest from the calling customer and ending with the one nearest to him. When the "execute" signal has traversed the control channel all selected trunks will have been seized from regular service and their talking conductors connected in series to form a direct communication channel between the two preferred customers.

In the foregoing description of this embodiment of our invention we have referred to the signals transmitted over the control channel as "prepare" and "execute" signals only to illustrate certain functions that these signals perform at the various switching centers. It will be realized that in this particular embodiment both "prepare" and "execute" signals are spacing signals of a minimum duration; the difference being in the direction in which the signals are sent relative to the calling or called customer.

In the previous example, for instance, the customer at the western end of the system originated the call, and the "prepare" spacing signal transversed the control channel from west to east while the "execute" spacing signal went from east to west. Had the customer at local switching center "East" originated the call, the "prepare" spacing signal would have been transmitted from east to west and the "execute" spacing signal in the opposite direction.

It will be obvious that numerous other signaling arrangements may be devised by those skilled in the art and still be within the purview of our invention.

*Called customer answers*

Returning now to the detailed description of operation, it will be recalled that the right-of-way call had progressed to a point whereby all selected trunks and lines had been disconnected from regular service and connected together between the preferred customers and that a ringing signal was being applied to the called customer's line.

When called preferred customer 210 lifts his receiver to answer the call, his loop is closed and ringing trip relay TP–E operates in a well known manner over the previously traced ringing path. Relay TP–E locks operated utilizing its right-hand winding and its contacts 5 over a circuit to ground through contacts 6 of relay IN–E.

In its operated condition, relay TP–E opens its contacts 1 and 2, to disconnect ringing source 616 from preferred customer line 219, and closes its contacts 3 and 4, to complete a communication path between preferred customer 210 and trunk 216.

When trunk 216 and line conductors 219 are interconnected a circuit is completed for operating supervisory relay S–E. This circuit can be traced from battery, through the right-hand winding of relay S–E, over conductor 608, over conductor 629, through contacts 4 of relay TP–E, over conductor 621, through contacts 2 of relay IN–E, over conductors 620 and 609, through contacts 4 of relay PMT–E, over conductor R219, through the switchhook contacts (not shown) at the station equipment of preferred customer 210, back over conductor T219, through contacts 3 of relay PMT–E, thence over conductors 610 and 619, through contacts 1 of relay IN–E, over conductor 618, through contacts 3 of relay TP–E, over conductors 630 and 611 and through the left-hand winding of relay S–E to ground.

With relay S–E operated a locking circuit for relay IN–E is completed. This circuit can be traced from ground, through contacts 1 of relay S–E, over conductor 631, through contacts 4 of relay IN–E and over conductor 615 to the winding of relay IN–E.

The preferred customers 110 and 210 can now converse with each other since their line conductors and all of the selected trunks have been disconnected from regular service and serially connected together to establish a direct communication channel between the two preferred customers. This channel includes line conductors 119, conductors 408 through 411 in FIG. 4, trunks 116 and 117 in FIG. 5, trunk 216, conductors 608 through 611 and line 219 in FIG. 6 with talking battery being furnished to customers 110 and 210, through the windings of supervisory relays S–W and S–E respectively.

At this point in the call it should be noted that each preferred customer is holding operated an associated supervisory relay (S–). Each S– relay is held operated over a closed loop which is under control of the switchhook contacts at each of the respective customer stations, and the S– relay in turn furnishes a locking path for an OUT– or an IN– relay depending on whether that particular customer originated or received the call. More specifically, the calling customer locks his OUT– relay operated, while the called party locks his IN– relay operated. With either an IN– or an OUT– relay operated at one of the local switching centers, the corresponding PMT–, PMTB– and SSP– relays also remain operated. Relays PMT– and PMTB– maintain the priority talking path at the local switching centers while the operated SSP– causes its associated carrier terminal to transmit a steady spacing signal to the next adjacent switching center where the signal is repeated to each successive intermediate toll switching center and to the local switching center at the other end of the signaling channel.

With each customer controlling the sending of signals (marking when he is on hook and spacing when he is off hook) over the signaling channel to the other customer the circuit has illustratively been arranged for last party disconnect. This feature can best be illustrated by turning to FIGS. 3 and 5, wherein it will be noted that the P relay, having once operated, is held operated to a circuit through contacts 6 of either the TRW or the TRE relay. Each of these relays stays operated independently of the other as long as a spacing signal is being received at its associated carrier terminal. For instance, relay TRE remains operated to hold relay P operated and also to transmit a spacing signal to the next adjacent carrier terminal to the east as long as east carrier terminal 504 is receiving a spacing signal from local switching center "West." It will be remembered from the previous description that when east carrier terminal 504 is receiving a spacing signal relays RW and SRW are released thereby completing the operating path for relay TRE. Similarly, relay TRW is held operated utilizing relays RE and SRE when a spacing signal is received over west carrier terminal 501 after being forwarded from customer 210.

With relay P at each intermediate switching center locked operated, as a result of either the west or east carrier terminal at that switching center receiving spacing signals indirectly from the customers at the corresponding ends of the control channel, transfer relay (TR1) also remains operated to maintain the selected trunks disconnected from regular service. The transfer relay will maintain the trunks disconnected from regular service and their conductors connected together until both customers have replaced their receivers thereby removing the spacing signals from the signaling channel in both directions to release both the TRE and TRW relays.

*Release of priority connection*

In describing the release of this arrangement, the operating circuits of the various relays will be interrupted at only one point. In reality, however, some relays may have their operating circuits interrupted at more than one point almost simultaneously which may affect the sequence in which the relays actually release.

To simplify the description with respect to the release of the entire circuit let it be assumed that preferred customers 110 and 210 have terminated their conversation and have replaced their receivers simultaneously.

When preferred customer 110 in FIG. 4 replaces his receiver, the operating circuit for supervisory relay S–W is interrupted releasing that relay. Relay S–W in releasing opens the locking circuit for relay OUT–W which releases causing relays PMT–W and PMTB–W to release. The release of relays OUT–W, PMT–W and PMTB–W interrupts the priority communication channel by disconnecting line conductors 119 from trunk 116. Relay PMT–W, in releasing, also interrupts the operating circuit for relay SSP–W, which releases thereby reclosing west-east send loop 124 and causing west carrier terminal 404 to shift frequency from space to mark and transmit a marking signal over carrier line 405.

With all of the above, relays released at local switching center "West" preferred customer 110 is reconnected to his regular line equipment 401, outgoing trunk equipment 402 is reconnected to trunk 116 and the busy indication is removed from sleeve conductors S119 and S116 thereby restoring the associated line and trunk equipments to regular service.

The transmission of a marking signal by west carrier terminal 404 is received at east carrier terminal 504 causing tube V53 thereat to conduct and reclose west-east receive loop 127 to reoperate receive relay RW. Relay RW, in reoperating, completes a circuit for reoperating relay SRW over its previously traced operating circuit. When relay SRW reoperates it opens its contacts 1 to interrupt the operating circuit for slow release relay TRE which releases.

Relays TRE and TRW have been made slow-to-release to time the duration of the frequency shift from a spacing signal to a marking signal which occurs when a customer disconnects. Relay TRE is responsive to the "West" customer's disconnect signal while relay TRW is responsive to the "East" customer's. This timing feature assures that the received signal is of a minimum duration indicative of a legitimate disconnect signal and not the result of a momentary electrical disturbance in the signaling link which might otherwise be falsely construed as a disconnect signal.

Relay TRE, in releasing, closes west-east send loop 128 thereby causing west carrier terminal 501 to shift frequency and send a marking signal over carrier line 505 to intermediate toll switching center "C" where similar operations occur with respect to RW, SRW and TRE relays (not shown). The RW, SRW and TRE relays in signaling and control circuit 222 at toll center "C" are equivalent to the RW, SRW and TRE relays of signaling and control circuit 122 at toll center "B" in FIG. 5. When the TRE relay is signaling and control circuit 222 has released, the frequency shift from a spacing to marking signal is transmitted from a west carrier terminal 633 to east carrier terminal 634. Upon receipt of a marking signal at east carrier terminal 634, west-east receive loop 225 is reclosed thereby reoperating relay RMK–E at local switching center "East."

In the meantime, called preferred customer 210 has replaced his receiver releasing his supervisory relay S–E. Relay S–E, in releasing, opens the holding circuit for relay IN–E which releases. Relay IN–E, in releasing, releases relays PMT–E, PMT–BE and SSP–E returning the disconnected trunk equipment 602 and line equipment 601 to normal at local switching center "East" and closing east-west send loop 224. The closure of east-west send loop 224 causes east carrier terminal 634 to shift frequency from space to mark and transmit a marking signal to west carrier terminal 633 at intermediate toll switching center "C."

Upon receipt of a marking signal at west carrier terminal 633, east-west receive loop 227 is reclosed causing a sequence of events to occur at intermediate toll switching center "C" which results in the restoration of trunks 117 and 216 to regular service and the forwarding of a marking signal over signaling link 121 to toll center "B."

The events causing the release of toll center "C" and the restoration of the trunks previously appropriated thereat, will be similar to the same operations now to be described with respect to intermediate toll switching center "B."

At intermediate toll switching center "B" a marking signal is being received at west carrier terminal 501 causing east-west receive loop 227 to close and reoperate relay RE in FIG. 5. Relay RE, in reoperating, closes its contacts 2 to reoperate relay SRE. With relay SRE operated the operating circuit for slow relay TRW is interrupted and relay TRW releases closing its back contacts 2 to reclose east-west send loop 126.

The closure of east-west send loop 126 causes east terminal 504 to shift frequency and transmit a marking signal to the next switching center toward the west, which in the instant disclosure is local switching center "West."

Having previously released the TRE relay upon receipt of a steady marking signal from the calling customer at local switching center "West" and now releasing the TRW relay upon receipt of a similar marking signal from the called customer at local switching center "East," the holding circuit for relay P in FIG. 5 is interrupted, and relay P releases. Relay P in releasing, removes ground from the marker sleeve leads 305 and 306 to control equipment 307 and reconnects these leads to their respective trunk equipments 304 and 302. In addition, relay P interrupts the operating circuit for transfer relay TR1 which also releases to reconnect one end of trunks 116 and 117 in FIG. 5 to their associated trunk equipments 302 and 304 and signaling equipments 301 and 305 shown in FIG. 3 and restore the corresponding "E" leads 311 and 312 to normal. Had the foregoing description with respect to the restoration of the trunks to regular service at intermediate toll switching center "B" been made with reference to the trunks at intermediate toll switching center "C" in FIG. 6, a TR1 relay (not shown) in transfer and make busy circuit 218 would have released to reconnect trunk 216 and the other end of trunk 117 to their respective equipments 625 and 624 and restore these equipments back to normal telephone service at switching center "C."

With the TR1 relays at all intermediate switching centers now released, all trunks are restored back to service in the regular telephone network. The priority arrangement has now been returned to normal and is ready for subsequent priority calls.

In its normal condition each terminal of an associated signaling link in the signaling and control channel is once again receiving a steady marking signal from the other terminal associated with the same link. These marking signals maintain the respective receive loops closed at each terminal to hold operated the corresponding receive relays. For instance, each carrier terminal designated "west" holds its RW and SRW relays operated while those carrier terminals designated "east" hold their RE and SRE relays held operated. This arrangement is true throughout except for the first and last terminals in the system whose receive loops each hold an RMK–relay operated at an associated local switching center.

*Protective and reliability equipment*

Turning now to FIG. 3 there is shown a relay, designated FG, connected through normal contacts 2 of relay P to conductor 313 which is in the operating circuit for transfer relay TR1. Relay FG has been provided to detect any foreign ground that may inadvertently be applied to conductor 313 causing relay TR1 to operate falsely, thereby erroneously commandeering the trunks from regular service in absence of a legitimate right-of-way service request.

If a false ground is present on conductor 313, relays TR1 and FG will operate. Relay FG closes its contact 1 in FIG. 5 to connect ground over conductor 509 to alarm circuit 510. Alarm circuit 510, when actuated, will alert the maintenance forces at that switching center to indicate that certain trunks have erroneously been seized from regular service.

In the aforementioned Gardner-Hysko patent there is disclosed a telegraph carrier supervisory circuit represented herein by tube 23′ and its associated circuitry which is shown at any one of the carrier terminals. For instance, at east carrier terminal 504 in FIG. 5, tube 23' has it anode circuit connected to a 130 volt positive source of potential through the winding of carrier supervisory relay RSW. Relay RSW remains operated as long as east carrier terminal 504 is receiving a carrier signal transmitted by west carrier terminal 404. If there is a carrier failure in the west to east carrier system of signaling link 120, relay RSW releases connecting a ground through its contacts over conductor 511 to alarm circuit 510 where an indicator, corresponding to the carrier system in trouble, is actuated. Similar carrier failure alarm provisions are provided at each intermediate switching center and also at the local switching centers at the ends of the signaling and control channel.

It will also be noted in the Gardner-Hysko patent that the failure of a carrier signal at any terminal would not cause the corresponding receive loop at that terminal to open. This feature described in detail in the Gardner-Hysko Patent 2,667,536 is known as the "mark hold" feature and is utilized herein to prevent the false operation of the signaling and control channel when a carrier failure occurs. If a carrier failure should occur when the signaling and control channel is normal, i.e., when the RE, RW or RMK– relays are normally being held operated by marking signals, the mark hold feature will continue to hold these relays operated thereby preventing a false frequency shift signal from being transmitted the entire length of the channel resulting in an erroneous commandeering of the trunks.

However, if the carrier failure should occur when a right-of-way call is in progress, at which time the signaling and control channel is off-normal and the RE, RW and RMK– relays are released, the "mark hold" signal will operate one of these relays corresponding to the link within which the carrier failure has occurred. The operation of one of these relays will cause a space to mark frequency shift signal to be transmitted in one direction over the signaling and control channel from the carrier system in trouble to the local switching center at the end of the signaling and control channel. It will be recalled that this frequency shift to marking signals during conversation is also an indication that one of the customers has replaced his receiver in an attempt to disconnect from the priority call. The signaling and control circuit, however, will not restore the priority communication channel to normal thereby interrupting the right-of-way call as long as the customer at the switching center receiving the false disconnect signal keeps his receiver off hook to maintain the transmission of steady spacing signals from his switching center to the other end of the channel.

It is to be understood that the above-described arrangements are merely illustrative of the application of the principles of the invention. Numerous other arrangements may be devised by those skilled in the art without departing from the spirit and scope of the invention.

What is claimed is:

1. A communication network comprising a first, a second, and an intermediate communication center serving customers, communication paths interconnecting said centers, control mechanisms at said intermediate center for rendering certain of said communication paths inaccessible to certain of said customers, circuit means for transmitting a signal from said first communication center to said intermediate communication center for partially enabling said control mechanism thereat, means effective upon the partial enablement of said control mechanism for transmitting a signal from said intermediate communication center to said second communication center, means at said second communication center responsive to the receipt of a signal from said intermediate communication center for transmitting a signal from said second communication center to said intermediate communication center, and means at said intermediate center effective upon the receipt of a signal from said second communication center when said control mechanism is partially enabled for completing the enablement of said mechanism to render said certain paths inaccessible to said certain customers.

2. In a communication network, a first communication center including regular customer circuits and a special customer circuit, a second communication center including regular customer circuits and a special customer circuit, an intermediate communication center comprising communication paths extending to said first and second centers for interconnecting said regular circuits and control means for rendering certain ones of said communication paths inaccessible to said regular circuits, first signaling means for signaling said intermediate control center from said first communication center for partially enabling said control means, means effective upon the partial enablement of said control means for sending a signal to said second communication center, second signaling means at said second communication center controlled incident to the reception of a signal from said intermediate communication center for returning a signal to said intermediate communication center, and means at said intermediate communication center controlled incident to the receipt of said return signal from said second communication center for completing the enablement of said control means to render said certain paths inaccessible to said regular circuits.

3. A communication network comprising a first communication center comprising regular customer circuits and a first special customer circuit, a second communication center comprising regular customer circuits and a second special customer circuit, an intermediate communication center comprising communication paths extending to said first and second centers for interconnecting said regular circuits, control means for rendering certain ones of said communication paths inaccessible to said regular circuits and means for rendering said certain paths accessible to only said special customer circuits, first signaling means controlled by said first special customer circuit for signaling said intermediate communication center from said first communication center, means at said intermediate communication center controlled incident to the receipt of a signal from said first communication center for partially enabling said control means, means effective upon the partial enablement of said control means for sending a signal to said second communication center, second signaling means controlled incident to the receipt of said signal from said intermediate communication center for returning a signal to said intermediate communication center, and means at said intermediate communication center controlled incident to the receipt of said return signal from said second communication center for completing the enablement of said control means to render said certain channels inaccessible to said regular circuits and accessible to only said special customer circuits.

4. The invention defined in claim 3 wherein said control means at said intermediate communication center comprises means responsive only to the concurrent reception of said first and second communication center signals independently of the order in which said signals were received.

5. In a communication network serving regular customer circuits and preferred customer circuits, a first switching center having a first preferred customer circuit; a second switching center having a second preferred customer circuit; an intermediate switching center comprising a first communication path accessible to said intermediate switching center regular customer circuits for interconnecting said regular customer circuits with said first switching center, a second communication path accessible to said intermediate switching center regular customer circuits for interconnecting said regular customer circuits with said second switching center, and actuable switching means effective when actuated for excluding said regular customer circuits from access to said communication paths and for interconnecting said preferred customer circuits; means under control of said first preferred customer circuit for sending a first signal to said intermediate switching center for preparing said switching means for actuation; means at said intermediate switching center effective when said switching means is prepared for actuation for sending a second signal to said second switching center; and means responsive to said second signal for sending a third signal to said intermediate switching center for actuating said switching means to interconnect said preferred customer circuits when said switching means is in its prepared condition.

6. In a communication network serving regular customer circuits and preferred customer circuits, a first switching center having a first preferred customer circuit; a second switching center having a second preferred customer circuit; an intermediate switching center comprising a first communication path accessible to said intermediate switching center regular customer circuits for interconnecting said regular circuits with said first switching center, a second communication path accessible to said intermediate switching center regular customer circuits for interconnecting said regular circuits with said second switching center, and actuable switching means effective when actuated for excluding said regular circuits from access to said communication paths and for interconnecting said preferred customer circuits; first signaling means under control of said first preferred customer circuit for sending a first signal over said first path to said intermediate switching center; means at said intermediate switching center controlled incident to the receipt of said first signal for partially actuating said switching means; second signaling means under control of said partially actuated switching means for sending a second signal over said second path to said second switching center; third signaling means at said second switching center controlled incident to the receipt of said second signal for sending a third signal over said second path to said intermediate switching center; and means at said intermediate switching center responisve to the reception of said third signal for completing the actuation of said switching means to exclude said regular customer circuits from said communication paths and interconnect said first and second preferred customer circuits.

7. The invention defined in claim 6 wherein said actuable switching means includes means responsive only upon the concurrent receipt of said first signal on said first path and said third signal on said second path independently of the order in which said signals are received.

8. The invention defined in claim 7 wherein each of said first and second communication paths comprises an associated communication channel and an associated signaling channel, wherein said first signaling means comprises means for signaling over a first signaling channel, wherein said second and third signaling means comprises means for signaling over a second signaling channel, and wherein said actuable switching means comprises means for excluding said regular circuits from said first and second communication channels.

9. In a switching network, a first switching center having regular customer stations and a first preferred customer station; a second switching center having regular customer stations and a second preferred customer station; an intermediate switching center; a first selected one of said trunks terminating at said first and said intermediate switching centers for interconnecting regular customer stations; a second selected one of said trunks terminating at said intermediate and said second switching centers for interconnecting regular customer stations; a preferred customer controlled by-pass arrangement comprising actuable control means at each said switching center effective when actuated for disconnecting any said regular customer stations interconnected over said selected trunks, means controlled by said first preferred customer station for actuating said first switching center control means and for sending a first signal to said intermediate switching center, first dual condition means at said intermediate switching center responsive to said first signal for assuming a first condition, means controlled by said first dual condition means in its first condition for sending a second signal to said second switching center, means at said second switching center responsive to said second signal for actuating said second switching center control means and for sending a third signal to said intermediate switching center, second dual condition means at said intermediate switching center responsive to said third signal for assuming a first condition, and means under the joint control of said first and second dual condition means each in its first condition for actuating said intermediate switching center control means wherein said by-pass arrangement is effective when all said control means are concurrently actuated for providing an intercommunication line including said selected trunks under the exclusive control of said first and second preferred customer stations.

10. The invention defined in claim 9 wherein each said control means comprises a transfer relay having an energizable winding, back contacts for connecting said selected trunks to said switching center, and front contacts for interconnecting said selected trunks independently of said switching center; and wherein said intermediate switching center transfer relay winding is initially energized when both said first and second dual condition means are in a said first condition.

11. A switching network serving regular and preferred customers comprising a plurality of switching centers including at least an originating, a terminating, and an intermediate switching center, said originating and terminating centers including calling and called preferred customer stations, respectively; trunk circuits at each of said switching centers; trunks interconnecting said trunk circuits; and a priority pre-empting arrangement comprising by-passing means corresponding to each said switching center and effective when completely enabled for disconnecting a selected trunk circuit thereat from its respective trunk for by-passing said corresponding regular customer stations; a carrier signaling arrangement including a first signaling link between said preferred calling customer station and said intermediate switching center and including a second signaling link between said intermediate switching center and said preferred called customer station, means under control of said calling customer station for completely enabling said originating switching center by-passing means and for sending a first signal over said first link to said intermediate switching center, first relay means at said intermediate switching center responsive to a said first signal persisting for an interval of time greater than a prescribed duration for partially enabling said intermediate switching center by-passing means and for sending a second signal over said second link to said terminating switching center, means at said terminating switching center responsive to said second signal on said second link for completely enabling said terminating switching center by-passing means and for automatically returning a third signal back over said second link to said intermediate switching center, and second relay means at said intermediate switching center responsive to a said third signal persisting for an interval of time greater than a prescribed duration for completing the enablement of said intermediate switching center by-passing means to disconnect said selected trunk circuitry from said first and second trunks and interconnect said calling and called preferred customer stations over said trunks in a manner so as to by-pass said switching center regular customers.

12. The invention defined in claim 11 wherein said first relay means comprises a first receiving relay releasable by said first signal, a first sending relay for sending said second signal and first timing means; wherein said second relay means comprises a second receiving relay releasable by said third signal, a second sending relay and second timing means; wherein each said timing means comprises means effective when its associated receiving relay is released for timing the duration of a said received signal; and wherein each said sending relay is rendered effective after an interval of time determined by said associated timing means.

13. The invention defined in claim 12 wherein said intermediate switching center by-passing means includes transfer relay means initially operated when only said first and second sending relays are rendered effective concurrently for disconnecting said selected trunk circuitry, and wherein said transfer relay means includes locking means under control of any one of said sending relays for maintaining said interconnection between said preferred calling and called customers.

14. A telephone system for interconnecting a plurality of regular customer stations over trunks for regular communication purposes comprising a first switching office having a first preferred customer station; a second switching office having a second preferred customer station; an intermediate switching office comprising a first selected one of said trunks connected to said first office for regular customer service, a second selected one of said trunks connected to said second office for regular customer service, and actuable control means for disconnecting said selected trunks from regular customer service and for establishing a priority connection between said preferred stations over said selected trunks; means controlled by said first preferred station for sending a first signal to said intermediate and said second office; means at said second office responsive to said first signal for sending a second signal to said intermediate office; and means at said intermediate office responsive to the concurrent reception of said first and second signals for actuating said control means to establish said priority connection.

15. A preferred customer communication arrangement for interconnecting a plurality of preferred customer stations for communication purposes comprising a first switching office including a first preferred customer station; a second switching office including a second preferred customer station; an intermediate switching office comprising switching equipment, a first trunk connected to said equipment and to said first office, and a second trunk connected to said equipment and to said second office; means controlled by said first preferred station for sending a first signal to said intermediate and said second office, means at said second office responsive to said first signal for sending a second signal to said intermediate office, and means at said intermediate office responsive to said first and second signals for interconnecting said first and second trunks to by-pass said intermediate office switching equipment and to interconnect said preferred stations.

16. In a multioffice trunk-connected telephone system serving regular and preferred customer stations, a first telephone office serving a first preferred station, a second telephone office serving a second preferred station, an intermediate office interposed between said first and second offices and connected to said first and second offices respectively over first and second selected ones of said trunks, actuable control means at said first intermediate office, and means controlled by said first preferred station for sending a first signal to said intermediate and said second office, means at said second office responsive to said first signal for sending a second signal to said intermediate office, and means at said intermediate office responsive to concurrent receipt of said first and second signals for actuating said control means to disconnect said selected trunks from said intermediate office and to interconnect said preferred stations.

17. A system for commandeering trunks from regular customer stations for interconnecting a plurality of preferred customer stations for communication purposes comprising a first switching office having a first preferred customer station, a second switching office having a second preferred customer station, an intermediate switching office connected to said first and second offices over first and second selected ones of said trunks, control means at said intermediate office for commandeering said selected trunks from regular station connection for interconnecting said preferred stations, means controlled by said first preferred station for sending a first signal to said intermediate and said second office, means at said second office responsive to said first signal for sending a second signal to said intermediate office, and means at said intermediate office responsive to the concurrent reception of said first and second signals for actuating said control means to commandeer said selected trunks.

References Cited by the Examiner

UNITED STATES PATENTS

| | | | |
|---|---|---|---|
| 2,365,996 | 12/44 | Bakker | 179—27 |
| 2,807,670 | 9/57 | Brandstetter et al. | 179—18 |
| 2,863,001 | 12/58 | Trousdale et al. | 179—18 |
| 2,943,155 | 6/60 | Rockwell | 179—27 |

ROBERT H. ROSE, *Primary Examiner.*

WALTER L. LYNDE, *Examiner.*